US 6,733,275 B2

(12) United States Patent
Fujita (10) Patent No.: US 6,733,275 B2
(45) Date of Patent: May 11, 2004

(54) ELECTRIC SPLIT NUT OPENING/CLOSING DEVICE IN MOLD CLAMPING APPARATUS (75) Inventor: Saburo Fujita, Nagoya (JP)

(73) Assignee: Mitsubishi Heavy Industries, LTD, Tokyo (JP)

( * ) Notice: Subject to any disclaimer, the term of this patent is extended or adjusted under 35 U.S.C. 154(b) by 0 days.

(21) Appl. No.: 10/085,059

(22) Filed: Mar. 1, 2002

(65) Prior Publication Data
US 2002/0127296 A1 Sep. 12, 2002

(30) Foreign Application Priority Data
Mar. 9, 2001 (JP) ....................... 2001-065933

(51) Int. Cl.[7] ............................................... B29C 45/64
(52) U.S. Cl. ....................................................... 425/595
(58) Field of Search ................. 425/589, 590, 425/595

(56) References Cited

U.S. PATENT DOCUMENTS 3,729,283 A * 4/1973 Eggenberger et al. ...... 425/595

FOREIGN PATENT DOCUMENTS

| DE | 200 06 618 | | 8/2000 |
|----|-----------|---|--------|
| JP | 50-17466 | * | 2/1975 |
| JP | 2-143811 | * | 6/1990 |
| JP | 8-276475 | * | 10/1996 |
| JP | 8-309811 | * | 11/1996 |
| JP | 8-323766 | * | 12/1996 |
| JP | 11-129303 | * | 5/1999 |
| JP | 2000-185345 | * | 7/2000 |

* cited by examiner

Primary Examiner—James P. Mackey
(74) Attorney, Agent, or Firm—Oblon, Spivak, McClelland, Maier & Neustadt, P.C.

(57) ABSTRACT

There is provided an electric split nut opening/closing device in which an electric motor is driven, and a half piece is moved linearly while the motion is restrained unequivocally, by which two left and right tie bars can be opened and closed at the same time by one device. In the electric split nut opening/closing device in which a tip-end threaded portion 65a of a tie bar 65, one end of which is fixed to either one of a fixed platen 61 and a movable platen 62 and the other end of which is projected by penetrating the other platen, is engaged with split nut 71, 72 provided on the other platen to connect the fixed platen 61 to the movable platen 62, by which a mold clamping force is generated between the platens by giving tension to the tie bar 65, a pair of left half piece 71a, 72a and right half piece 71b, 72b of the split nut 71, 72 are slidably supported so as to hold the tie bar 65 therebetween, and the left half piece 71a, 72a and right half piece 71b, 72b of the two sets of split nuts 71 and 72 are brought into contact with and separated from each other at the same time by common driving means 86 so as to hold the tie bar 65.

9 Claims, 9 Drawing Sheets

ELECTRIC SPLIT NUT OPENING/CLOSING DEVICE IN MOLD CLAMPING APPARATUS

BACKGROUND OF THE INVENTION

1. Field of the Invention

The present invention relates to a split nut opening/closing device for tie bar, which is applied to a mold clamping apparatus for an injection molding machine, a pressing machine, or the like. More particularly, it relates to an electric split nut opening/closing device in a mold clamping apparatus, which has a simple construction and high response.

2. Description of Related Art

Conventionally, in the mold clamping apparatus for an injection molding machine, a movable platen is brought closer to a fixed platen generally fixed to an apparatus base by using a cylinder with a small diameter and a large stroke, and thereby molds attached to the movable and fixed platens are brought into contact with each other, by which mold closing is performed. At this time, a two-piece nut (split nut) is engaged with and connected to a threaded portion at the tip end of each of four tie bars that are fixed to one platen and project from the other platen, by which a mold clamping force is generated by giving tension to the tie bar using a large-diameter and small-stroke cylinder. As an opening/closing device for this split nut, various types of devices have so far been proposed.

First Conventional Example

A "mold clamping split nut opening/closing device" (Unexamined Japanese Utility Model Publication No. 4-87218) of a type such that a split nut is opened and closed horizontally using an electric motor will be described as a first conventional example with reference to FIGS. 9 and 10.

Figure 9:
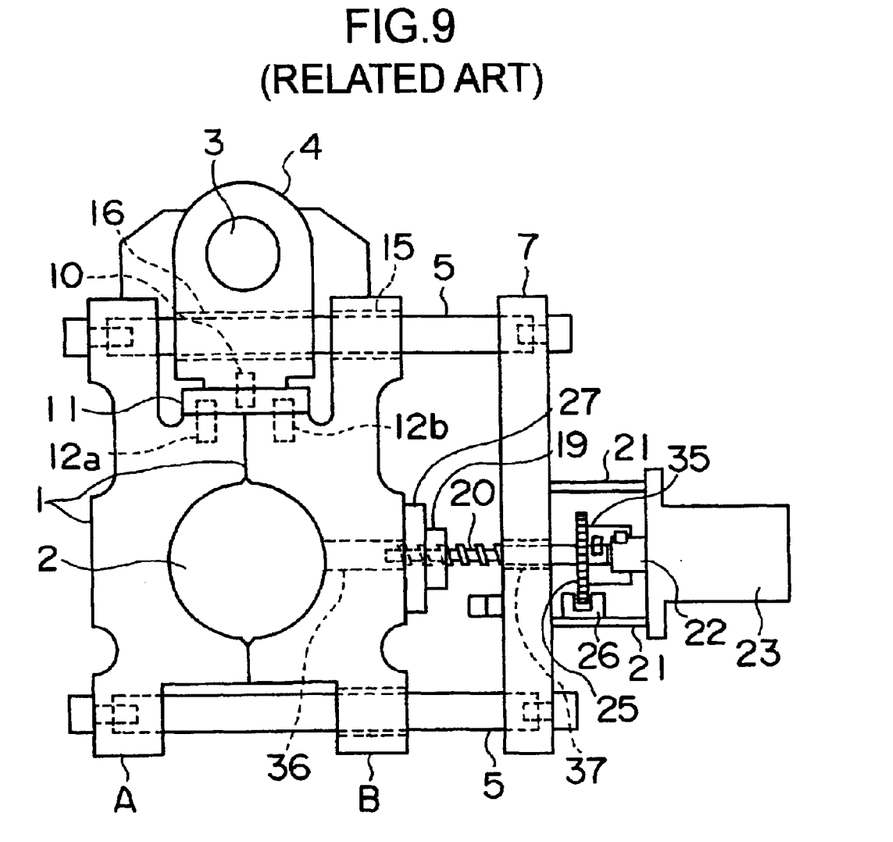
FIG. 9 is a front view of a mold clamping split nut opening/closing device, showing a first conventional example.
Figure 10:
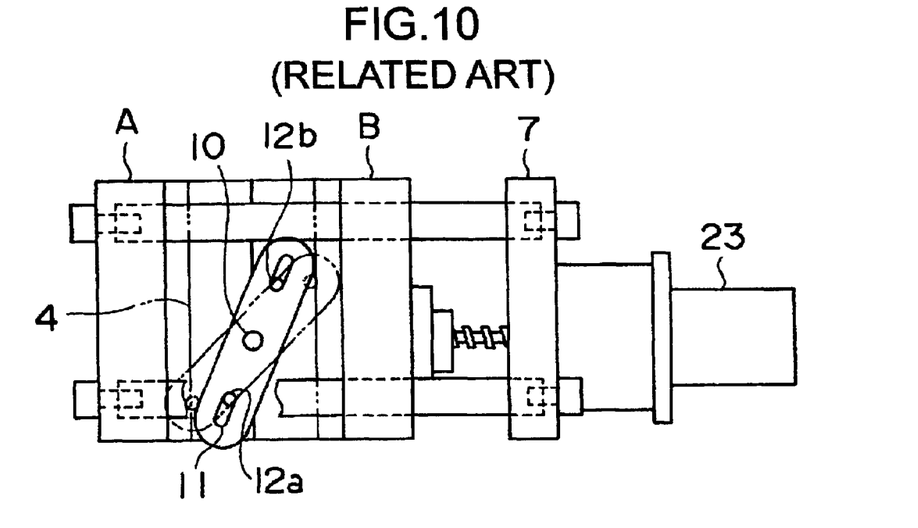
FIG. 10 is a plan view of FIG. 9, in which the device is viewed from the upside.

As shown in FIG. 9, this split nut 1 consists of a pair of, left and right, half pieces A and B. A slide box 4 is disposed in an upper space between the half pieces A and B, and two guide rods 5 are inserted in the side portions of the half pieces A and B and the slide box 4. In the lower part, one guide rod 5 is inserted in the half pieces A and B. Both ends of each of these guide rods 5 are fixed to the half piece A and a plate 7. The half piece B and the slide box 4 are slidable via bushes 15 and 16, respectively. The slide box 4 is slidably supported by a guide stand 3 projecting from a position just over a tie bar 2 of a fixed platen (not shown), and is configured so as to be movable in the axial direction (direction perpendicular to the paper in FIG. 9) of the tie bar 2.

The plate 7 is fitted with an electric motor 23 via a bracket 21. To an output shaft 22 of the electric motor 23, a ball screw 20 is connected via a coupling 35. Also, the ball screw 20 is inserted in a hole 36 in the half piece B and a hole 37 in the plate 7, and is engaged with a ball nut 19. The ball nut 19 is fixed to the half piece B via an adapter plate 27, thus forming opening/closing drive means for the split nut 1.

Also, on the bottom surface of the slide box 4 is protrusively provided a support pin 10, and on the top surfaces of the left and right half pieces A and B are protrusively provided pins, 12a and 12b, respectively. As shown in FIG. 10, the support pin 10 is inserted in a round hole in the center of a link plate 11, and pins 12a and 12b are inserted in elongated holes at both ends thereof.

Reference numeral 25 denotes a slit plate fixed to the coupling 35, and 26 denotes a pulse sensor fixed to the bracket 21. By these elements, the rotation of the ball screw 20 is counted to find the position of the half piece B.

In order to close the split nut 1 in the open state in which the half pieces A and B are separated, the electric motor 23 is rotated in the direction such that the ball nut 19 is moved away. The half piece B is moved in the direction such as to come closer to the half piece A, and the pin 12b turns the link plate 11 around the support pin 10 in the closing direction (counterclockwise direction in FIG. 10). At this time, the link plate 11 turning in the closing direction moves the half piece A in the closing direction (right direction in FIG. 10) via the pin 12a. Thus, the half pieces A and B move while always maintaining the symmetrical position with respect to the tie bar 2 lying in the same position as the support pin 10.

Inversely, in order to open the closed split nut 1, the above-described operation has only to be performed entirely reversely, so that the explanation thereof is omitted.

The engagement phase of the threaded portion of the split nut 1 with the tie bar 2 is adjusted by an engagement adjusting device, not shown.

Second Conventional Example

Although the above-described split nut opening/closing device is provided on each of four tie bars in the first conventional example, a split nut opening/closing device for opening and closing two split nuts by one cylinder has been proposed as a closing device in a "mold fixing device of injection and compression molding machines" (Japanese Patent Publication No. 37-8490). This device will be described as a second conventional example.

Figure 11:
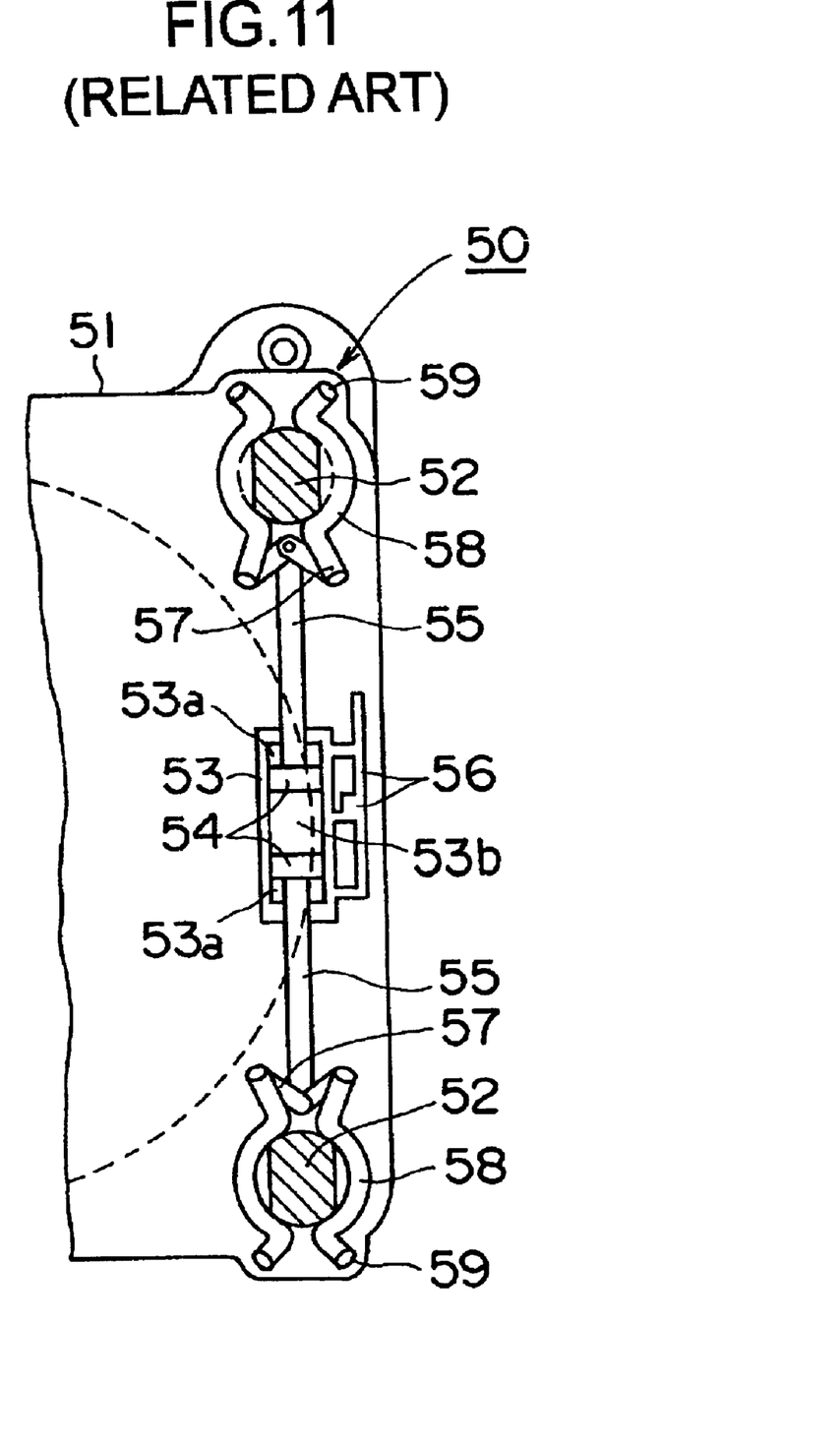
FIG. 11 is a front view of a split nut opening/closing device, showing a second conventional example.

FIG. 11 shows an opening/closing device (closing device) 50. In FIG. 11, reference numeral 51 denotes a movable platen (movable attachment plate), 52 denotes a tie bar (transverse rod), 53 denotes a cylinder, 54 denotes two pistons in the cylinder 53, 55 denotes two rods (piston rods), 56 denotes a conduit tube. The rod 55 is connected to one end of a link plate (bent rod) 57, and the other end of the link plate 57 holds one end of a half piece 58 of a split nut (holding member). The other end of the half piece 58 is rotatably supported by a pin (shank) 59 provided on the movable platen 51.

When a pressure oil is supplied from the conduit tube 56 to two oil chambers 53a on both sides of the cylinder 53, the rod 55 decreases its stroke, so that the link plate 57 turns so as to be horizontal, increasing the transverse length. The half piece 58 is turned around the pin 59 to be opened, by which the connection with the tie bar 52 is released. Also, when the pressure oil is inversely supplied to an oil chamber 53b on the center of the cylinder 53, the rod 55 increases its stroke, so that the link plate 57 turns so as to form an angle with respect to the horizon, whereby the half piece 58 is turned and closed.

In this device, which of the two rods 55 and the half piece 58 moves earlier cannot be determined unequivocally.

The opening/closing device of the first conventional example is of a type such that the electric motor 23 is driven to linearly move the half pieces A and B, by which the split nut is opened and closed to the right and left. Therefore, the opening/closing device of this type has an advantage of high response, but has a disadvantage of complicated construction because the opening/closing device is provided on each of the four tie bars 2.

The opening/closing device of the second conventional example is of a type such that one cylinder 53 is used for two upper and lower tie bars 52 to rotationally move the half pieces 58 on the circumference, by which the split nut is opened and closed to the right and left. Therefore, the opening/closing device of this type has an advantage of simple construction of device because two split nuts are opened and closed by one cylinder 53, but has disadvantages of low response because of the use of the cylinder 53 and less unequivocalness of the motion of the rod 55 of the cylinder 53 and the half piece 58.

SUMMARY OF THE INVENTION

An object of the present invention is to provide an electric split nut opening/closing device in a mold clamping apparatus, in which an electric motor is driven to linearly move a half piece while unequivocally restraining the motion, by which two right and left tie bars are opened and closed at the same time by one device.

To solve the above problems, the present invention provides solving means by using the configurations described below.

The present invention provides an electric split nut opening/closing device in a mold clamping apparatus in which a fixed platen for holding a fixed mold and a movable platen for holding a movable mold are provided, and a tip-end threaded portion of a tie bar, one end of which is fixed to either one of the platens and the other end of which is projected by penetrating the other platen, is engaged with a split nut provided on the other platen to connect the fixed platen to the movable platen, by which a mold clamping force is generated between the platens by giving tension to the tie bar, wherein a pair of left half piece and right half piece of the split nut are slidably supported so as to hold the tie bar therebetween, and the left half piece and right half piece of the two sets of split nuts are brought into contact with and separated from each other at the same time by common driving means so as to hold the tie bar.

Also, in the present invention, one of the half pieces constituting the split nut is driven by a reciprocating device driven by a motor; the movement of the one half piece is transmitted to the other half piece via a link mechanism; and the other half piece is brought into contact with and separated from one half piece in connection with one half piece.

Further, in the present invention, a guide box is provided in positions of two tie bars on the other platen; the guide box slidably support the paired left half piece and right half piece of the left and right split nuts so as to hold the tie bar; the guide box is provided with a link plate rotatably supported via a support pin; a pin engaging with an elongated hole formed at both ends of the link plate is provided on each of the left half piece and right half piece; and the left half piece and right half piece are link connected in a restrained manner so as to move symmetrically with respect to the support pin.

Still further, in the present invention, two connecting rods penetrate the two sets of left half piece and right half piece; one end of the connecting rod is fixed to one half piece, and the other half piece is slidably supported; a geared motor with brake is mounted on a plate fixed to the connecting rod; and the left half piece and right half piece of one split nut are brought closer to and separated from each other via a reciprocating mechanism provided on an output shaft of the geared motor with brake.

Also, in the present invention, the left half piece and right half piece of one split nut are brought closer to and separated from each other by a reciprocating device consisting of a ball shaft connected to the output shaft of the geared motor via a coupling and a ball nut which engages with the ball shaft and is connected to the right half piece of one split nut.

Further, in the present invention, the guide box is made up of attachment portions attached to a side portion and a front portion of the platen, two bottom plates for supporting the half pieces of the split nut, and a groove portion provided between the bottom plates.

The present invention can use a rotating crank mechanism in place of the aforementioned reciprocating device.

Specifically, the present invention can be configured so that the left half piece and right half piece of one split nut are brought closer to and separated from each other by a driving device comprising a geared motor with brake whose output shaft is installed to a bracket fixed to the connecting rod so as to be perpendicular to the connecting rod; a crank arm which is fixed to the output shaft of the geared motor with brake and has a pin at the tip end; a joint member which is installed to the right half piece of one split nut via an adapter member and is given an initial compressive force by spring means; and a connecting link one end of which is rotatably connected to the tip-end pin of the crank arm and the other end of which is rotatably connected to the joint member via a pin.

Further, the present invention can be configured so that the tip-end pin of the crank arm is supported at both ends, and the connecting link has a curved shape so as to avoid the interference with the crank arm.

BRIEF DESCRIPTION OF THE DRAWINGS

FIG. 5 is views showing an electric split nut opening/closing device in accordance with a second embodiment of the present invention, FIG. 5(*a*) being a partially sectioned front view showing a state in which a split nut is open, FIG. 5(*a*1) being a plan view showing a left-hand side link plate portion shown in FIG. 5(*a*);

DETAILED DESCRIPTION OF THE PREFERRED EMBODIMENTS

Embodiments of the present invention will now be described in detail with reference to the accompanying drawings.

First Embodiment

A first embodiment of an electric split nut opening/closing device in accordance with the present invention will be described with reference to FIGS. 1 to 4.

Figure 1:
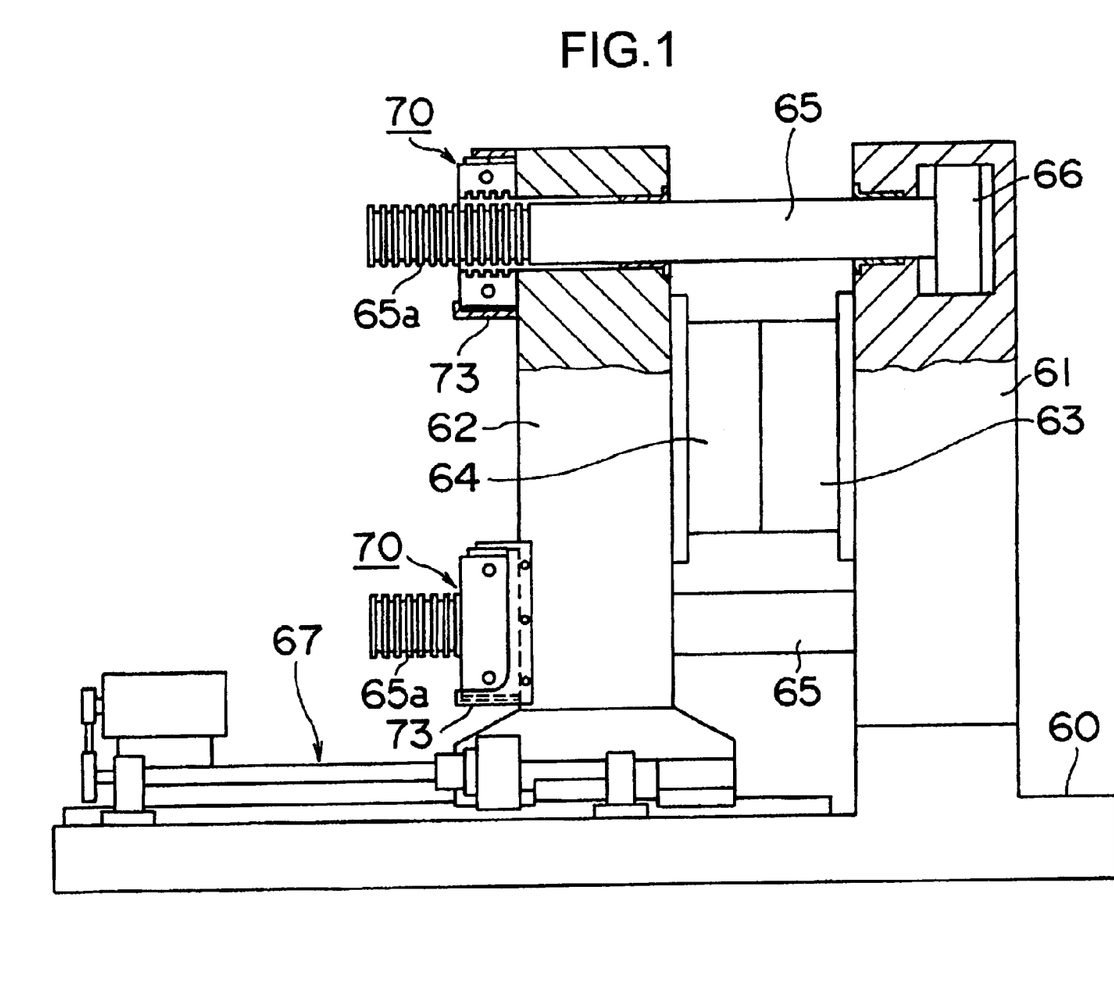
FIG. 1 is a partially sectioned side view of a mold clamping apparatus for an injection molding machine on which an electric split nut opening/closing device in accordance with a first embodiment of the present invention is mounted.
Figure 2:
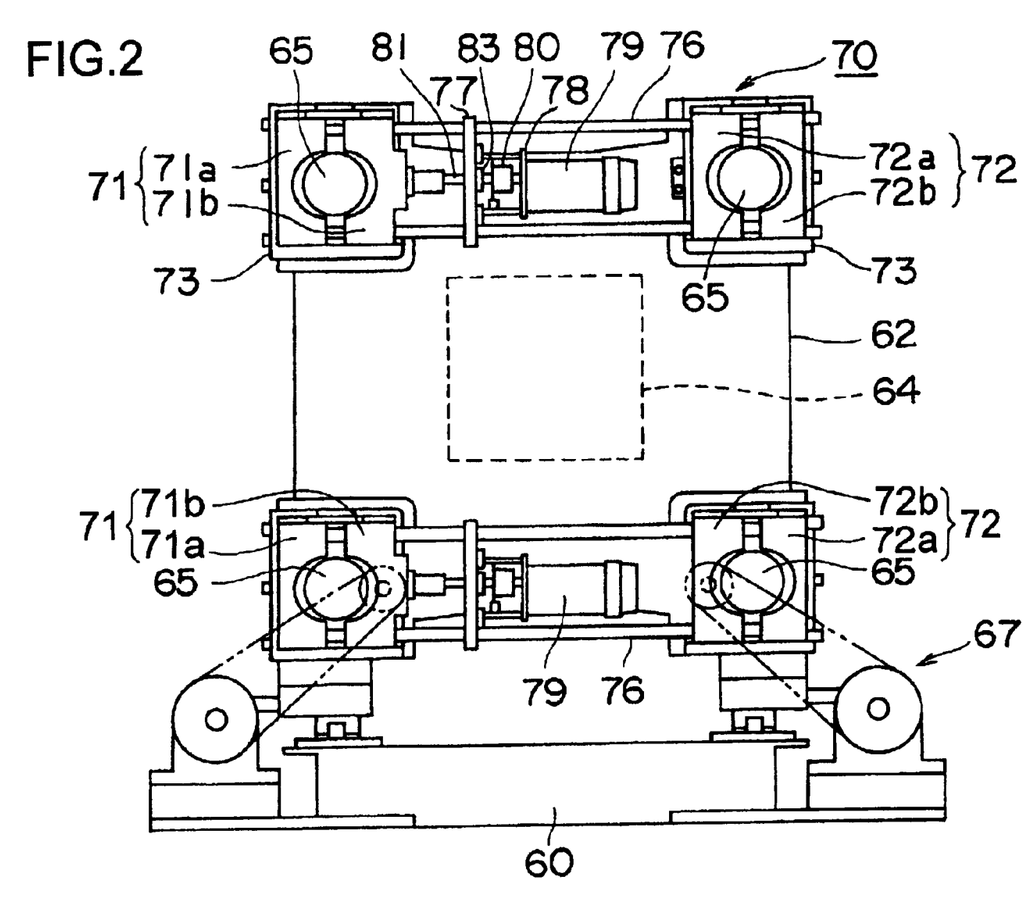
FIG. 2 is a front view of FIG. 1.
Figure 3:
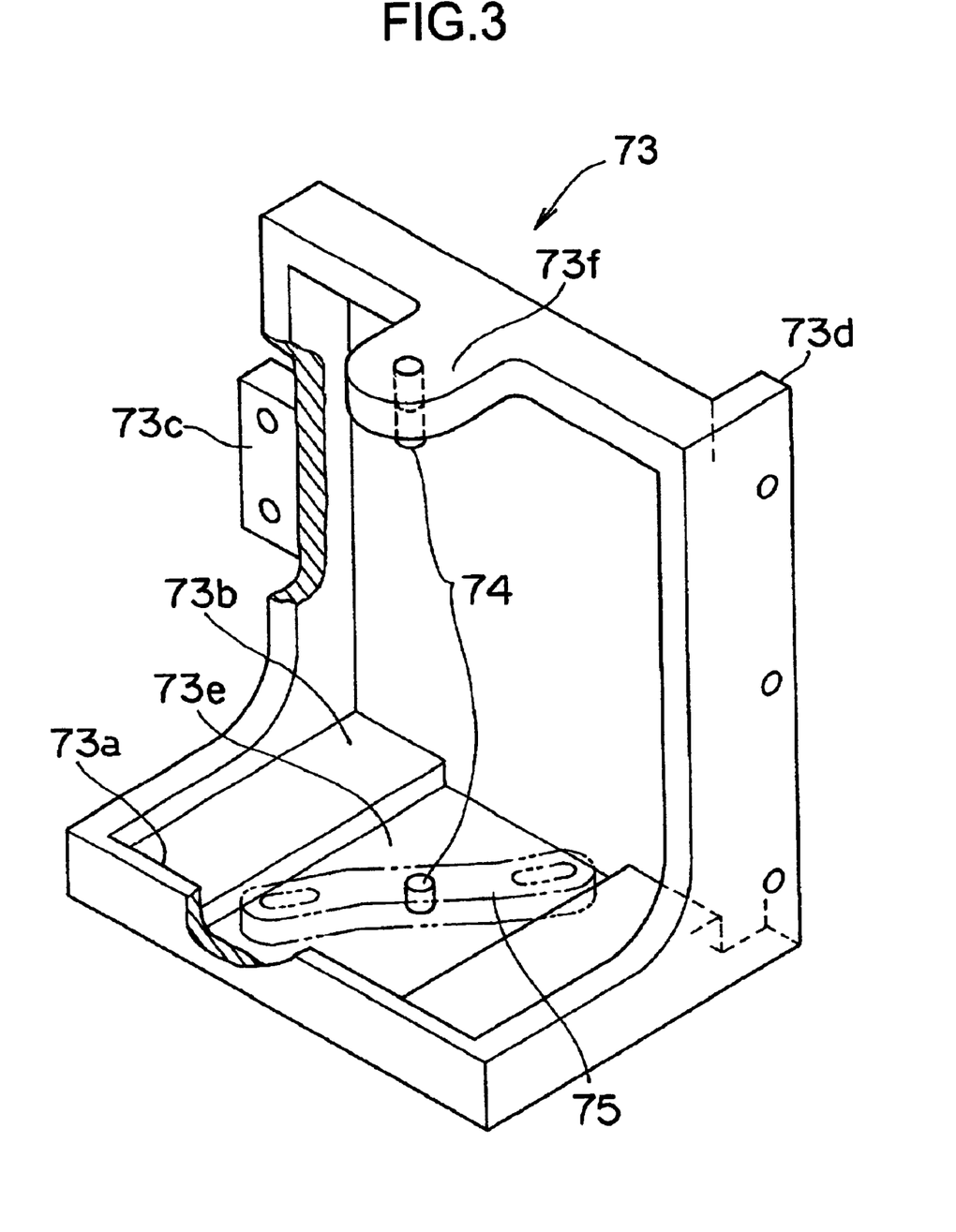
FIG. 3 is a perspective view enlargedly showing a guide box shown in FIG. 1.
Figure 4:
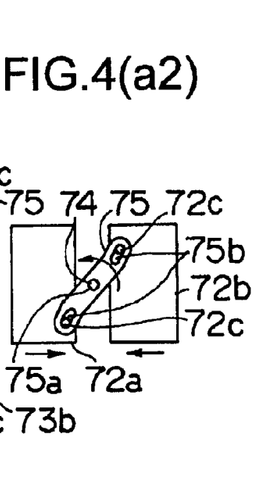
FIG. 4 is views showing the details of construction and the operation of an electric split nut opening/closing device in accordance with a first embodiment of the present invention, FIG. 4(*a*) being a partially sectioned front view showing a state in which a split nut is open, FIG. 4(*a*1) being a plan view showing a left-hand side link plate portion shown in FIG. 4(*a*), FIG. 4(*a*2) being a plan view showing a right-hand side link plate portion shown in FIG. 4(*a*), FIG. 4(*b*) being a front view showing a state in which a split nut is closed, and FIG. 4(*b*1) being a plan view showing a left-hand side link plate portion shown in FIG. 4(*b*)

FIG. 1 is a partially sectioned side view of a mold clamping apparatus for an injection molding machine on which this electric split nut opening/closing device is mounted, FIG. 2 is a front view of FIG. 1, in which the device is viewed from the left, FIG. 3 is a perspective view of a guide box, and FIGS. 4(*a*), 4(*a*1), 4(*a*2), 4(*b*) and 4(*b*1) are views for illustrating the details of construction and the operation of the electric split nut opening/closing device.

In FIGS. 1 and 2, reference numeral 60 denotes a base of a mold clamping apparatus. At one end of the base 60 is fixed a fixed platen 61.

A movable platen 62 is slidably disposed on the base 60 so as to face the fixed platen 61. A fixed mold 63 is attached to the fixed platen 61, and a movable mold 64 is attached to the movable platen 62 so as to face the fixed mold 63.

Between the fixed platen 61 and the movable platen 62, four tie bars 65 are provided so that the two platens can be brought closer to and separated from each other. At the tip end of each of these tie bars 65, a threaded portion or a grooved portion (hereinafter referred to as a threaded portion) 65*a* is provided. At one end of the tie bar 65, which is opposite to the threaded portion 65*a*, a piston 66 for generating a mold clamping force is provided. On the base 60 is provided electric movable platen moving means 67.

FIG. 1 shows a state in which what we call mold closing is finished. In this state, the movable platen 62 is moved toward the fixed platen 61 by the movable platen moving means 67, and thereby the movable mold 64 is brought into contact with the fixed mold 63.

Reference numeral 70 denotes two sets of the same electric split nut opening/closing devices installed in the upper and lower part on the face of the movable platen 62, which is on the side opposite to the movable mold 64. Hereunder, the upper-side device will be described.

Reference numerals 71 and 72 denote a left split nut and right split nut which are engaged with the two upper left and upper right tie bars 65, respectively. Reference numerals 71*a* and 71*b*, and 72*a* and 72*b* are a pair of left half piece and right half piece of the left split nut 71 and the right split nut 72, respectively. These half pieces are supported in a guide box 73 fixed to the movable platen 62 so as to be slidable in the horizontal direction (right-left direction in FIG. 2).

FIG. 3 is a perspective view of the guide box 73 on the right-hand side. The guide box 73 has a box shape having a bottom plate 73*b* provided with a lip 73*a* in the lower part, being open in the front and rear, and being surrounded at the side. Attachment portions 73*c* and 73*d* provided at both sides of the guide box 73 are screwed to the front face and the side face of the movable platen 62. The split nut 71, 72 is placed slidably on the bottom plate 73*b* while the rear face thereof is brought into contact with the movable platen 62 and the front lower portion is guided by the lip 73*a*. On a groove portion 73*e* provided in the central portion of the bottom plate 73*b* and a bracket portion 73*f* provided in the upper part, support pins 74 projecting upward and downward are provided in positions in which the center of the tie bar 65 passes through.

Figure 4A:
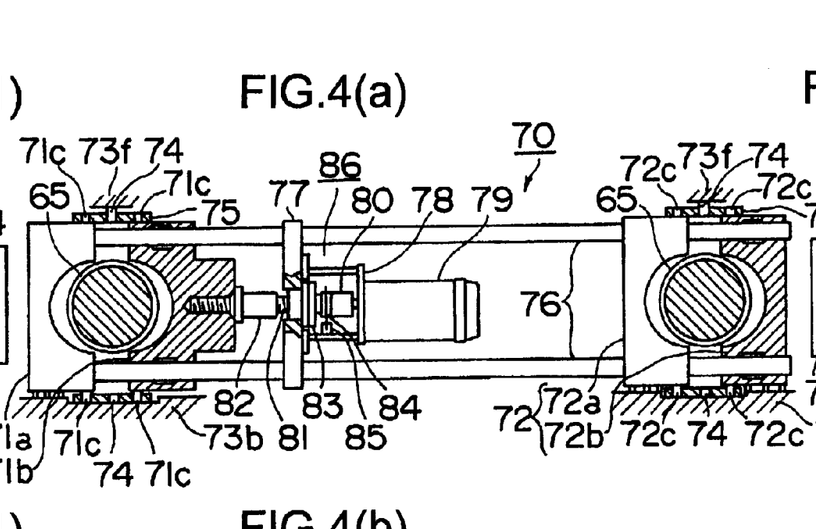
Figure 4B:
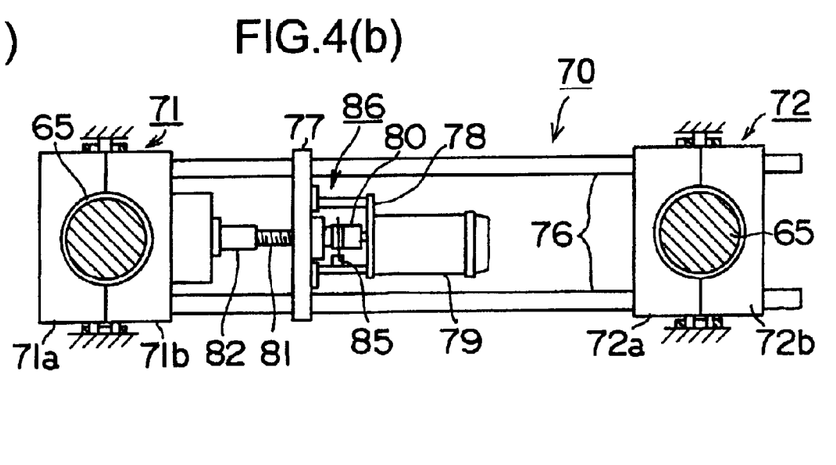

Also, as shown in FIG. 4(*a*), on the upper and lower faces of the half pieces 71*a* and 71*b*, pins 71*c* are provided so as to project upward and downward, and on the upper and lower faces of the half pieces 72*a* and 72*b*, pins 72*c* are provided so as to project upward and downward. A link plate 75 has a round hole 75*a* in the center thereof and two elongated holes 75*b* at both ends thereof in positions symmetrical with respect to the round hole 75*a*. The link plate 75 is installed with the support pin 74 being inserted in the round hole 75*a* in the center and pins 71*c* on the upper and lower faces of the half pieces 71*a* and 71*b*, and pins 72*c* on the upper and lower faces of the half pieces 72*a* and 72*b* being inserted the elongated holes 75*b* at both ends.

Two, upper and lower, connecting rods 76 transversely penetrate the left and right split nuts 71 and 72, and the half pieces 71*a* and 72*a* are fixed to these connecting rods 76. The half pieces 71*b* and 72*b* are slidably supported on the connecting rods 76 in a position such as to face the half pieces 71*a* and 72*a*. On the connecting rods 76 between the half piece 71*b* and the half piece 72*a*, a plate 77 is fixed. on this plate 77, a geared motor with brake (hereinafter referred to as a motor) 79 is installed via a bracket 78. To the output shaft of this motor 79, a ball shaft 81 is connected via a coupling 80.

A ball nut 82 engaging with the ball shaft 81 is installed on the right-hand side face of the half piece 71*b*, and a thrust developing on the ball shaft 81 is received by a thrust bearing 83 fixed to the plate 77. The tip end of the ball shaft 81 is loosely engaged with a hole formed in the half piece 71*b* so as not to interfere with the hole. Also, the coupling 80 is provided with a slit plate 84, and the bracket 78 is provided with a pulse sensor 85 for counting the number of slits in the slit plate 84. Screw type driving means 86 is formed by the elements denoted by reference numerals 77 and 85.

If an increase in play for drive friction and motion is allowed, the ball shaft 81 and the ball nut 82 may be replaced with a square thread for motion and a square thread nut, respectively.

The operation of the electric split nut opening/closing device 70 constructed as described above will be described with reference to FIG. 4.

FIG. 4(*a*) is a front view showing a state in which the opening/closing device 70 is open, FIG. 4(*a*1) and FIG. 4(*a*2) are views in which the split nuts 71 and 72 at both ends of FIG. 4(*a*) are viewed from the upside, FIG. 4(*b*) is a front view showing a state in which the opening/closing device 70 is closed, and FIG. 4(*b*1) is a view in which the split nut 71 is viewed from the upside.

When the mold is closed by the movable platen moving means 67 (see FIG. 1), the threaded portion 65*a* at the tip end of the tie bar 65 intrudes into the opened split nuts 71 and 72, and stops in a position such as to be capable of being engaged by an engagement adjusting device, not shown. When the motor 79 is driven so as to move the ball nut 82 away from the motor 79, the half pieces 71*a* and 71*b* come closer to each other, and the link plates 75 in the upper and lower part turn in the counterclockwise direction in FIG. 4(*a*1). Since the center of the link plate 75 is kept in the position of the tie bar 65 by the support pin 74, the half pieces 71*a* and 71*b* come closer to each other so as to hold the tie bar 65 from both sides, and engage with the threaded portion 65*a*. At this time, since the half piece 72*a* is made integral with the half piece 71*a* by the connecting rods 76, it moves toward the tie bar 65 through the same distance as that of the half piece 71*a*, and a moment that turns the upper and lower link plates 75 in the counterclockwise direction around the support pin 74 is produced. This moment draws the pin 72*c* and in turn the half piece 72*b* toward the tie bar 65, by which the split nut 72 is closed.

The motor 79 can be started and stopped exactly by counting the number of slits in the slit plate 84 using the pulse sensor 85 to detect the position of the ball nut 82.

When the motor 79 is stopped, an attached brake is operated to keep the ball shaft 81 in the stopped state, by which the split nuts 71 and 72 are kept in the closed state.

In order to open the split nuts 71 and 72, the above-described closing operation has only to be reversed; therefore, the explanation is omitted.

According to the above-described embodiment, the following effects can be achieved.

(1) Since the opening/closing operation is performed at the same time by one opening/closing device 70 for two tie bars 65, the number of parts is small, and thus the cost can be reduced.

(2) Since the opening/closing device 70 is driven by the electric motor 79, the response is high, so that the operation time can be shortened as compared with the case where an oil pressure cylinder is used for driving.

(3) Since the left and right half pieces 71a and 71b are opened and closed at the same time using the link plates 75 while the symmetrical position with respect to the tie bar 65 is maintained, the cycle time can be shortened.

(4) Since the opening/closing operation is performed at the same time by one opening/closing device 70 for two sets of split nuts for two tie bars 65, the number of parts is small, and thus the cost can be reduced.

(5) Since the device is configured so that the left half piece and the right half piece of one split nut are brought closer to or separated from each other, the reciprocating operation can be performed surely.

(6) Since the guide box is made up of the attachment portion attached to the side portion and the front portion of the movable platen, the two bottom plates supporting the half pieces of the split nut, and the groove portion provided between the bottom plates, the split nut can be held surely.

Second Embodiment

Next, a second embodiment of an electric split nut opening/closing device in. accordance with the present invention will be described with reference to FIGS. 5 to 8.

Figures 5, 5A:
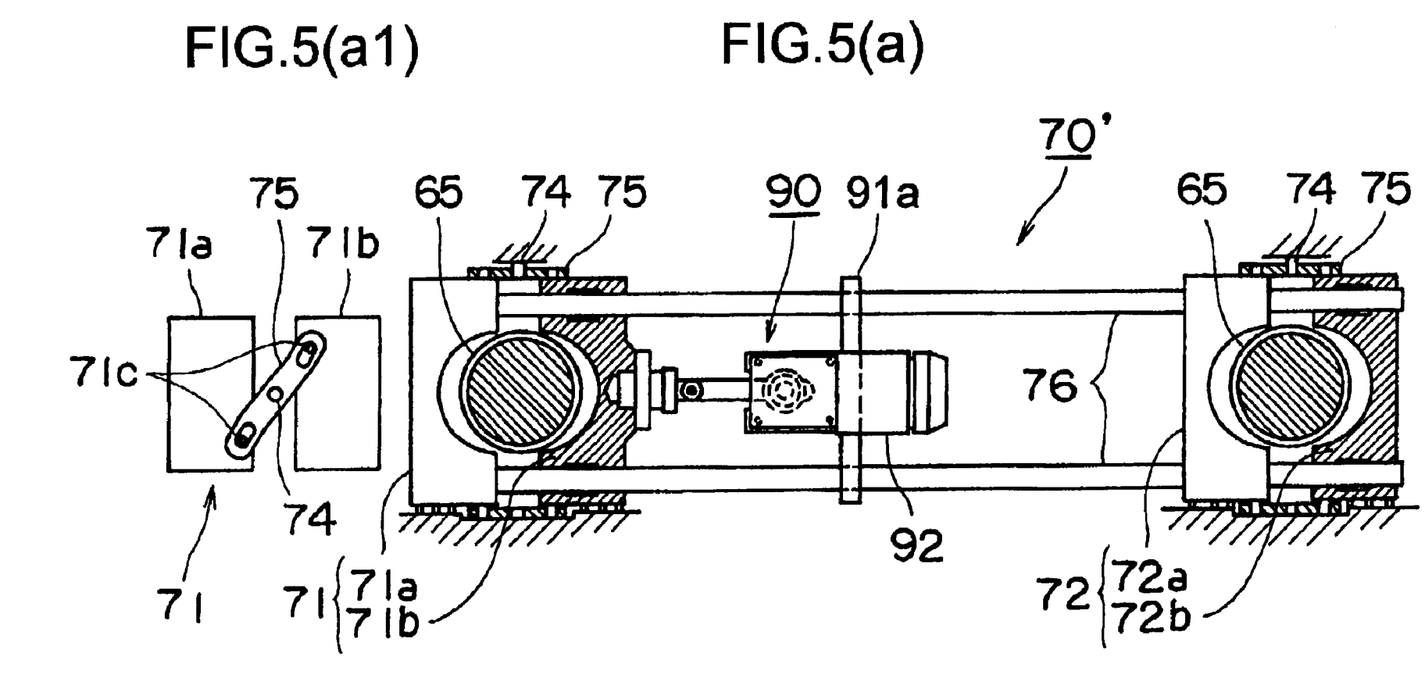
Figure 6:
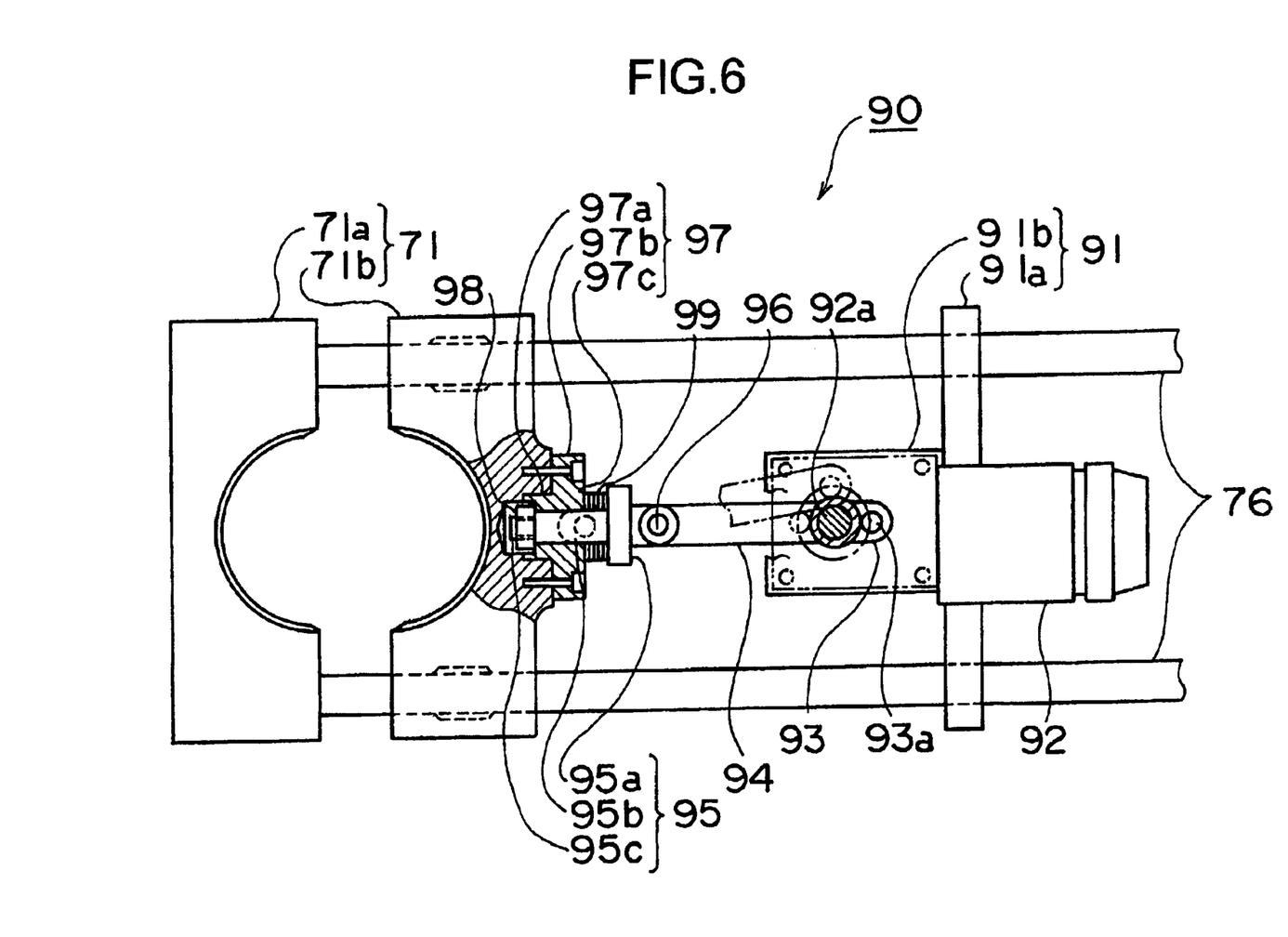
FIG. 6 is a partially enlarged view of a reciprocating mechanism shown in FIG. 5.
Figure 7:
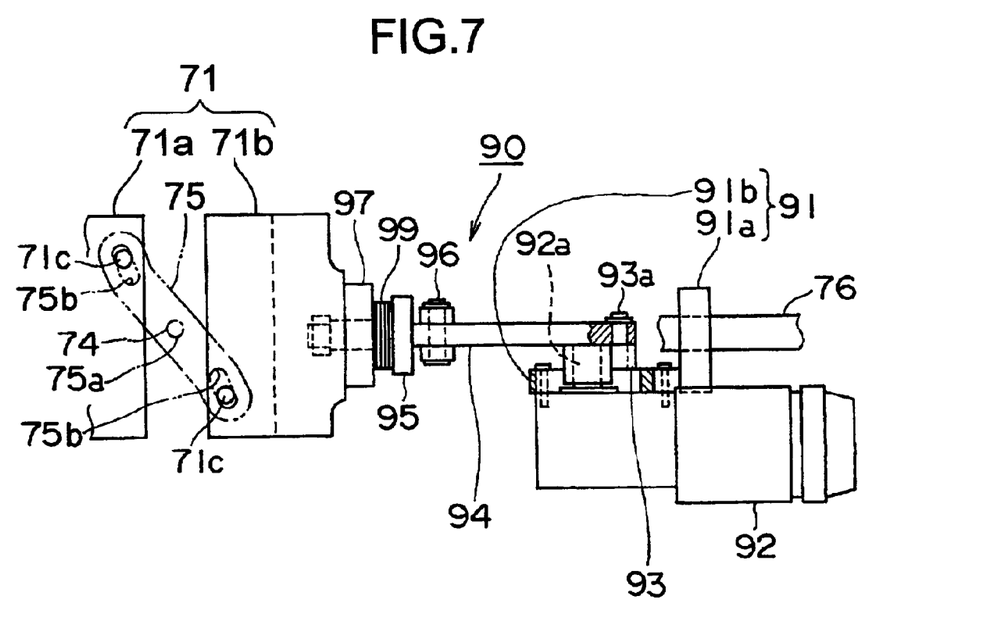
FIG. 7 is a plan view of the reciprocating mechanism shown in FIG. 6, in which the reciprocating mechanism is viewed from the upside.

FIG. 5(a) is a front view showing the general construction of this opening/closing device 70' in an opened state, FIG. 5(a1) is a view in which a left split nut 71 is viewed from the upside, FIG. 6 is an enlarged view of a half on the left-hand side of FIG. 5, and FIG. 7 is a plan view in which FIG. 6 is viewed from the upside. This opening/closing device 70' has almost the same construction as that of the opening/closing device 70 of the first embodiment. Therefore, the same reference numerals are applied to the same or similar elements and the explanation thereof is omitted, and only different driving means will be described.

In FIGS. 6 and 7, reference numeral 90 denotes the whole of driving means, and 91 denotes a bracket fixed to the connecting rods 76. The bracket 91 includes a plate 91a attached to the connecting rods 76 and a motor attachment plate 91b (see FIG. 6) fixed so as to be perpendicular to the plate 91a and parallel with the connecting rods 76. On the motor attachment plate 91b, a geared motor with brake (for example, hypoid geared motor) 92 (hereinafter referred to as a motor) is installed with four screws. An output shaft 92a of the motor 92 is at right angles to the connecting rods 76. At the tip end of the output shaft 92a, a crank arm 93 is fixed via a key with a setscrew. At the other end of the crank arm 93, a pin 93a projects on the opposite side of the motor 92. In the central portion of the motor attachment plate 91b, a hole is formed not to hinder the rotation of the crank arm 93.

Reference numeral 94 denotes a connecting link having holes at both ends thereof. The pin 93a of the crank arm 93 is loosely engaged with one of these two holes so as to be rotatable, and is fixed with a washer and a retaining ring.

Reference numeral 95 denotes a joint member. The joint member 95 has a rod 95b projecting in the lower part (left-hand side in the figure) of a clevis portion 95a and an external thread 95c with a diameter smaller than that of the rod 95b at the tip end of the rod 95b. The clevis portion 95a is rotatably engaged with the other hole of the connecting link 94 by a headed pin 96, and is fixed with a washer and a retaining ring.

Reference numeral 97 denotes an adapter member screwed through a threaded hole in a flange portion 97b by inserting a cylindrical portion 97a in a hole provided in the half piece 71b. The adapter member 97 slidably supports the rod 95b of the joint member 95 by a cylindrical hole 97c provided in the central portion. Reference numeral 98 denotes a round nut engaging with the external thread 95c of the rod 95b, and 99 denotes a plurality of (four in FIG. 6) belleville springs with a large spring constant. The belleville spring 99 is fitted on the rod 95b of the joint member 95 together with the adapter member 97, and is tightened by a nut 98 to provide a predetermined initial compressive force.

The operation of the electric split nut opening/closing device 70' of the second embodiment constructed as described above will be described.

Figure 8:
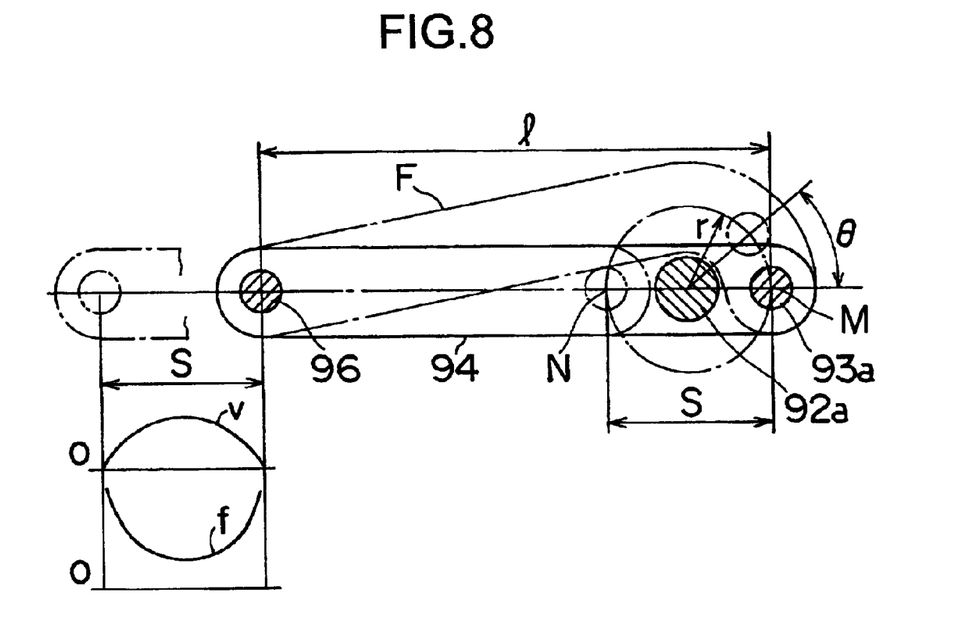
FIG. 8 is a schematic view for illustrating the operation of a crank arm and a connecting link of an electric split nut opening/closing device in accordance with a second embodiment.

FIG. 8 is an explanatory view showing the movement of the crank arm 93 and the connecting link 94 shown in FIGS. 5 and 6. When the split nut 71 is in the open position, the pin 93a of the crank arm 93 lies at point M on the horizontal line. When the crank arm 93 is turned by the motor 92 and the pin 93a shifts to point N, the pin 93a moves horizontally through a distance s that is two times the radius r of the crank arm 93. Thus, the headed pin 96 inserted in a hole at the other end of the connecting link 94 (lengthwise direction) restrained on the horizontal line is moved through a distance s in the direction such that the half piece 71b is closed.

The distance s of stroke is set slightly larger than a clearance between the half pieces 71a and 71b at the time of opening to prevent a gap from being produced therebetween at the time of closing. The interference of stroke is absorbed by contracting the belleville spring 99 to slide the rod 95b of the joint member 95 with respect to the adapter 97. The belleville spring 99 is given a predetermined initial compressive force in advance, and thus the connecting link 94 presses the half piece 71b via the headed pin 96 with a force exceeding the initial compressive force.

The crank arm 93 and the connecting link 94 form a reciprocating slide rotation mechanism. As shown in the lower left portion of FIG. 8, when the angle the crank arm 93 makes with the horizontal line is taken as θ, the velocity v of the headed pin 96 is approximately proportional to sin θ, and the horizontal pressing force f is inversely proportional to v. At points M and N, which are dead points, the velocity v is zero and the pressing force f is infinite. Therefore, the detection of stop position at points M and N does not require high accuracy, so that a general-purpose limit switch can be used. Also, a large clamping force of the split nut 71 can be obtained easily by a motor with a low capacity.

In order to open the closed split nut, the pin 93a has only to be returned from point N to point M by turning the crank arm 93 in the same direction or the reverse direction.

In FIG. 7, the crank arm 93 is connected to the output shaft 92a of the motor 92 in a cantilever form. However, when the pin 93a, which is a driving shaft for the crank arm 93, is supported at both ends, the connecting link 94 and the pin 93a interfere with each other, so that the angle of rotation and the direction of angle are restricted. Therefore, in order to turn the crank arm 93 through 180 degrees, the connecting link 94 must have a curved shape, for example, as indicated by the two-dot chain line in FIG. 8, and the motor 92 must be rotated normally and reversely.

According to the above-described second embodiment, the following effects can be achieved.

(1) In the opening/closing device of the second embodiment, since the half piece is stopped at the dead points of the reciprocating slide rotation mechanism, the detection of stop position does not require high accuracy, and a large clamping force at the time of stoppage can be obtained by a motor with a low capacity.

(2) Since the pin at the tip end of the crank arm is supported at both ends, and the connecting link has a curved shape to prevent interference with the crank arm, the interference of the connecting link with the pin can be avoided.

It is a matter of course that the present invention is not limited to the above-described embodiments, and any change can be made appropriately without departing from the spirit and scope of the present invention.

What is claimed is:

1. A split nut opening/closing device in a mold clamping apparatus in which a fixed platen for holding a fixed mold and a movable platen for holding a movable mold are provided, and a tip-end threaded portion of a plurality of tie bars, one end of which is fixed to either one of said platens and the other end of which is projected by penetrating the other platen, is engaged with a split nut provided on the other platen to connect said fixed platen to said movable platen via said tie bars, by which a mold clamping force is generated between said platens in order to clamp said fixed and movable platens by giving tension to said tie bars, wherein each pair of left half piece and right half piece of said split nuts are slidably supported by guide boxes attached to the other platen so as to hold said tie bars therebetween, two connecting rods penetrate two pairs of left half piece and right half piece provided respectively on said tie bars, one end of the connecting rod is fixed to a first half piece of the left half piece and the right half piece and a second half piece of the left half piece and the right half piece is slidably supported by the connecting rod, the second half piece and the first half piece are link connected so as to be brought into contact with and separated from each other, and driving means is provided wherein the movement of the first half piece is transmitted to the second half piece via a link mechanism, and the second half piece is brought into contact with and separated from said first half piece in connection with said first half piece, wherein the guide boxes each include two bottom plates for supporting each pair of left half piece and right half piece and a groove portion provided between the bottom plates for receiving the link mechanism.

2. The split nut opening/closing device in a mold clamping apparatus according to claim 1, wherein said guide box is provided with the link mechanism that includes a link plate rotatably supported via a support pin and a pin engaging with an elongated hole formed at both ends of said link plate that is provided on each of said left half piece and right half piece; and said left half piece and right half piece are link connected in a restrained manner so as to move symmetrically with respect to said support pin.

3. The split nut opening/closing device in a mold clamping apparatus according to claim 1, wherein a geared motor with brake is mounted on a plate fixed to said connecting rods; and the left half piece and right half piece of said split nuts are brought closer to and separated from each other via a reciprocating device provided on an output shaft of said geared motor with brake.

4. The split nut opening/closing device in a mold clamping apparatus according to claim 3, wherein the left half piece and right half piece of said split nuts are brought closer to and separated from each other by the reciprocating device consisting of a ball shaft connected to the output shaft of said geared motor via a coupling and a ball nut which engages with said ball shaft and is connected to the right half piece of said split nuts.

5. The split nut opening/closing device in a mold clamping apparatus according to claim 2, wherein said guide box is made up of attachment portions attached to a side portion and a front portion of said other platen.

6. A split nut opening/closing device in a mold clamping apparatus in which a fixed platen for holding a fixed mold and a movable platen for holding a movable mold are provided, and a tip-end threaded portion of a plurality of tie bars, one end of which is fixed to either one of said platens and the other end of which is projected by penetrating the other platen, is engaged with a split nut provided on the other platen to connect said fixed platen to said movable platen via said tie bars, by which a mold clamping force is generated between said platens in order to clamp said fixed and movable platens by giving tension to said tie bars, wherein each pair of left half piece and right half piece of said split nuts are slidably supported by the other platen so as to hold said tie bars therebetween, two connecting rods penetrate two pairs of left half piece and right half piece provided respectively on said tie bars, one end of the connecting rod is fixed to a first half piece of the left half piece and the right half piece and a second half piece of the left half piece and the right half piece is slidably supported by the connecting rods, the second half piece and the first half piece are link connected so as to be brought into contact with and separated from each other, and driving means is provided wherein the movement of the first half piece is transmitted to the second half piece via a link mechanism, and the second half piece is brought into contact with and separated from said first half piece in connection with said first half piece, wherein a geared motor with brake is mounted on a plate fixed to said connecting rods; and the left half piece and right half piece of said split nuts are brought closer to and separated from each other via a rotating crank mechanism provided on an output shaft of said geared motor with brake.

7. The split nut opening/closing device in a mold clamping apparatus according to claim 6, wherein the left half piece and right half piece of said split nuts are brought closer to and separated from each other by a driving device comprising the geared motor with brake whose output shaft is installed to a bracket fixed to said connecting rods so as to be perpendicular to said connecting rods; a crank arm which is fixed to the output shaft of said geared motor with brake and has a pin at the tip end; a joint member which is installed to the right half piece of one split nut via an adapter member and is given an initial compressive force by spring means; and a connecting link one end of which is rotatably connected to the tip-end pin of said crank arm and the other end of which is rotatably connected to said joint member via a pin.

8. The split nut opening/closing device in a mold clamping apparatus according to claim 7, wherein the tip-end pin of said crank arm is supported at both ends, and said connecting link has a curved shape so as to avoid the interference with said crank arm.

9. A split nut opening/closing device for a mold clamping apparatus, the mold clamping apparatus including a fixed platen, a movable platen, and a plurality of tie-bars each having a first end fixed to either one of said platens and a second end that penetrates the other platen, where the second end has a tip-end threaded portion, said split nut opening/closing device comprising:

- a first split nut adapted to be provided on the other platen to connect the fixed platen to the movable platen via one tie bar of the tie bars by engaging the tip-end threaded portion thereof, said first split nut including a first half piece and a second half piece that are slidably supported by a first guide box attached to the other platen;
- a first link mechanism connecting said first half piece of said first split nut to said second half piece of said first split nut;
- a second split nut adapted to be provided on the other platen to connect the fixed platen to the movable platen via another tie bar of the tie bars by engaging the tip-end threaded portion thereof, said second split nut including a first half piece and a second half piece that are slidably supported on the other platen;
- a second link mechanism connecting said first half piece of said second split nut to said second half piece of said second split nut;
- a connecting rod is fixed to said first half piece of said first split nut and said first half piece of said second split nut, said connecting rod being slidably connected to said second half piece of said first split nut and said second half piece of said second split nut; and
- a driving device configured to drive one of said first half piece and said second half piece of said first split nut, wherein both of said first half piece and said second half piece of said first split nut are moved via said first link mechanism, wherein said first half piece of said second split nut is moved via said connecting rod, and wherein both of said first half piece and said second half piece of said second split nut are moved via said second link mechanism, wherein the first guide box includes two bottom plates for supporting said first half piece and said second half piece of said first split nut and a groove portion provided between said bottom plates for receiving said first link mechanism.

\* \* \* \* \*